United States Patent
Xing et al.

(10) Patent No.: US 10,954,171 B2
(45) Date of Patent: Mar. 23, 2021

(54) METHOD FOR PRODUCING STABLE FERTILIZER BY NANO-CARBON SOL

(71) Applicant: BEIJING NANO HI-TECH MATERIAL CO., LTD., Beijing (CN)

(72) Inventors: Wenying Xing, Beijing (CN); Ligang Zuo, Beijing (CN); Yue Xiao, Beijing (CN)

(73) Assignee: BEIJING NANO HI-TECH MATERIAL CO., LTD., Beijing (CN)

( * ) Notice: Subject to any disclaimer, the term of this patent is extended or adjusted under 35 U.S.C. 154(b) by 273 days.

(21) Appl. No.: 16/088,809

(22) PCT Filed: Sep. 29, 2017

(86) PCT No.: PCT/CN2017/104380
§ 371 (c)(1),
(2) Date: Sep. 26, 2018

(87) PCT Pub. No.: WO2018/064957
PCT Pub. Date: Apr. 12, 2018

(65) Prior Publication Data
US 2020/0299209 A1    Sep. 24, 2020

(30) Foreign Application Priority Data

Oct. 3, 2016 (CN) .......................... 201610877904.1

(51) Int. Cl.
*C05G 3/90* (2020.01)
*C05C 9/00* (2006.01)
*C05D 9/00* (2006.01)

(52) U.S. Cl.
CPC .................. *C05G 3/90* (2020.02); *C05C 9/00* (2013.01); *C05D 9/00* (2013.01)

(58) Field of Classification Search
None
See application file for complete search history.

(56) References Cited

FOREIGN PATENT DOCUMENTS

| CN | 101362659 A | | 2/2009 | |
|---|---|---|---|---|
| CN | 101633590 A | | 1/2010 | |
| CN | 102249801 A | | 11/2011 | |
| CN | 102816002 A | | 12/2012 | |
| CN | 104591855 A | | 5/2015 | |
| CN | 106495814 A | | 3/2017 | |
| CN | 106518573 A | | 3/2017 | |
| CN | 106699319 | * | 5/2017 | |
| CN | 107721597 A | * | 2/2018 | ............... C05G 3/00 |

OTHER PUBLICATIONS

Liu, Jian et al., "Application effect of fertilizer added with nano carbon on rice" Phosphate & Compound Fertilizer; ISSN: 1007-6220; Issue No. 6; Nov. 15, 2011; pp. 76-77.
Zhang, Zhiming et al., "The Research of Increasing the Yield by Nano-synergistic Fertilizer on Hybrid Rice" Humic Acid; ISSN: 1671-9212; Issue No. 2; Apr. 15, 2012; pp. 15-19.
The International Search Report of corresponding International PCT Application No. PCT/CN2017/104380, dated Dec. 27, 2017.

* cited by examiner

*Primary Examiner* — Wayne A Langel
(74) *Attorney, Agent, or Firm* — J.C. Patents

(57) ABSTRACT

A method for producing stable fertilizer by nano-carbon sol comprising: the pH of the nanometer carbon sol is <2.2, conductivity is 2800-3400 μs/cm; the content of carbon content of nano-carbon sol reaches 0.57-2%, particle size<100 nm, potential difference is −30-35 mv;
The addition of nano carbon sol as synergist in nitrogen-containing fertilizers was 1.05 to 10% of the weight of nitrogen-containing fertilizers. Nano-carbon sol is added in the growing process of crops, or in the production process of nitrogen-containing fertilizers. The invention can make fertilizer nutrient supply stable and increase yield obviously: there was no lack of fertilizer in the late stage of crop, and the average yield increased by 5-18%; the utilization rate of fertilizer can be improved. The nitrification inhibition rate of the present invention reaches 6.3-6.8%, the inhibition rate of nitrification of nitrogenous compound fertilizer was 19-25%, it is an environmental friendly fertilizer synergist, and it will not cause any residual damage to soil crops.

3 Claims, No Drawings

METHOD FOR PRODUCING STABLE FERTILIZER BY NANO-CARBON SOL

CROSS-REFERENCE TO RELATED APPLICATION

This application is a national phase application of international application No. PCT/CN2017/104380 filed on Sep. 29, 2017, which in turn claims the priority benefits of Chinese application No. 201610877904.1, filed on Oct. 3, 2016. The contents of these prior applications are hereby incorporated by reference in their entirety.

TECHNICAL FIELD

The invention relates to a method for producing stable fertilizer by nano-carbon sol, which belongs to the area of stable fertilizer synergist.

BACKGROUND

After many years of experimenting, scientists from Beijing Nano Hi-Tech Material Co. Ltd (hereinafter "the Company") have found that the crops grew earlier and faster when nanometer carbon sol was used for crop growth. The results of multi-field and multi-crop experiments have proved that nano-carbon sol can improve crop yield. It is proved by standard test that nano-carbon sol can inhibit ammonium nitrification, which can be used as stable fertilizer synergist. Stable fertilizers refer to the addition of urease inhibitors and/or nitrification inhibitors through a certain process, The application of urease inhibitor in soil can inhibit the hydrolysis of urea, and (or) can inhibit the nitrification of ammonium nitrogen through nitrifying inhibitor, so that the fertilizer efficiency can be extended. As is known to all, China has become the world's largest producer and consumer of fertilizers, Fertilizer application amount reaches 60 million tons per year (broken down). However, the average utilization rate of fertilizer in China is only about 33%, lower than that of developed countries in the world, excessive and unreasonable fertilization causes a series of environmental and agricultural safety problems such as eutrophic soil compaction in water. The application of nano-carbon in stable fertilizer is of great importance to improve the efficiency of fertilizer. The combination of nanometer carbon sol and fertilizer shows the characteristics of stable fertilizer. First, it can improve the utilization rate of fertilizer. Reducing the amount of fertilization will not harm the root system of crops due to the high concentration of local fertilizers. Second, it improves the soil nutrient balance and provides the carbon and required elements for plant growth, to stimulate the uptake of plant biomass nutrients, and to improve the growth resistance; Thirdly, it improves the quality of agricultural products; For example, soluble solids of tomato and fruit is improved, and taste sweet. At last, nano-carbon stable fertilizers have lower cost, better effect and easier to be popularized than film-coated slow-release fertilizer. As a fertilizer additive, nano-carbon sol only increases the cost of general fertilizers by 2-3%, while film-coated slow-release fertilizer increases the cost by 1-2 times. Therefore, the development of nano-carbon stable fertilizers can solve the problems of environmental pollution with low utilization rate of fertilizers, It is of great significance to reduce the input of petrochemical performance source and realize zero growth of fertilizer application and sustainable development of agriculture.

SUMMARY

A method for producing stable fertilizer by nano-carbon sol comprising: the pH of the nanometer carbon sol is <2.2, conductivity is 2800-3400 μs/cm; the content of carbon content of nano-carbon sol reaches 0.57-2%, particle size<100 nm, potential difference is −30-35mv;

The addition of nano carbon sol as synergist in nitrogen-containing fertilizers was 1.05 to 10% of the weight of nitrogen-containing fertilizers. Nano-carbon sol additive is used to apply nitrogenous fertilizer which contains one or more of urea, nitrogenous compound fertilizer and water flush fertilizer.

Nano-carbon sol is added in the growing process of crops, or in the production process of nitrogen-containing fertilizers, when added, the mass fraction of nano-carbon sol was 0.57%-2% or concentrated to 8-10%, fully contact and mix drying, drying temperature is 50-6511, cooling packed. Nano-carbon sol is added directly in the process without adding water solution, the amount added as fertilizer synergist is 1.05 to 10% of the weight of fertilizer.

Features of the Present Invention

1. As a synergist, the addition amount of nano carbon sol in nitrogen-containing fertilizer is 1.05 to 10% of the weight of fertilizer, and the pH value of nano carbon sol is 2.2.
2. The invention discloses a nanometer carbon sol nitrogen fertilizer with a nitrification inhibition rate of 6.3-6.8% and a nitrification inhibition rate of 19-25% for nitrogenous compound fertilizer, Shanghai institute of chemical technology was tested with reference of national standard stable fertilizer testing)), when the inhibition rate of nitrification reaches more than 6%, it meets the standard of stable fertilizer synergist.
3. The nano-carbon sol can be used separately in the growing process of crops, and can also be added as nitrogen-containing fertilizer synergist in the production process, the content of carbon in nanometer carbon sol was 0.57%-2%. The concentration can be reached to 8-10%.
4. The invention discloses a nanometer carbon sol which is tested by the safety of environmental and health-related products of the Chinese center for disease control and prevention, it is an actual non-toxic product and an environment-friendly fertilizer synergist and will not cause any residual damage to soil crops.
5. The nanometer carbon sol of the present invention is a pure carbon substance, which will not cause soil pollution. It different from dicyclohexylamine (DCD), dicyclohexylamine 2-diethylamine ethanol, phenylethylene and other harmful substances, which has residual compound risk.
6. Low additive cost: the added cost of nano-carbon sol is only 2%-3% of the price of ordinary fertilizers. The processing cost of film-coated slow-release fertilizer is more than 50-1 times.
7. The invention discloses a nanometer carbon sol as a fertilizer synergist, which can make the fertilizer nutrient supply stable and increase the yield obviously: there was no lack of fertilizer in the late stage of crop, and the average yield increased by 5-18%, the utilization rate of fertilizer can be improved.

Compared with the Same Kind

1. The present invention has different objects of action, and the present invention refers specifically to the action on nitrogen-containing fertilizers and not specifically to the action on carbon-containing fertilizers.

2. The present invention relates to nanometer carbon sol, which is different from other urease inhibitors, in inhibiting ammonium nitrogen nitrification.
3. The nanometer carbon sol of the present invention is a pure carbon substance, which will not cause soil pollution. It different from dicyclohexylamine (DCD), dicyclohexylamine 2-diethylamine ethanol, phenylethylene and other harmful substances, which has residual compound risk.
4. The nanometer carbon sol is a liquid and completely soluble in water, which is different from water soluble compounds such as dicyandiamide (DCD) and solid nano-carbon materials.
5. The invention discloses a nano-carbon sol with a pH value of <2.2 and a potential difference of −35mv, which is different from other nano-carbon materials with a pH of more than 2.5.
6. The invention discloses that as a synergist of nitrogen-containing fertilizer, the amount of carbon nanoparticles added in nitrogen-containing fertilizer is 1.05-10% of the total weight of fertilizer, different from other patents, it adds 0.1-1% of the total weight of carbon-containing fertilizer can add 0.1-0.5% of the total weight of compound fertilizer.
7. The invention discloses that the particle size of nanometer carbon sol material used in nitrogen-containing fertilizers is <100 nm, which is different from other application products range of >100 nm.
8. The present invention is a pure carbon nano-scale sol, without adding any species, potassium compound, fertilizer, trace elements, coal ash, slag, used oil, rosin etc.

After years of research and discovery: nano-carbon sol has wide-spectrum and high adaptability, suitable for field crops such as corn, rice and soybeans, commercial crop such as tobacco, vegetables, flowers and fruit trees. It shows good effect of increasing production, fertilization under the same conditions reduces the amount of fertilizer used by 10%, and the yield will not affect the yield and will improve the quality of agricultural products.

DESCRIPTION OF THE PREFERRED EMBODIMENTS

Embodiment 1

The results of experiments on the application of nano-carbon urea on maize crops carried out by Bama Agricultural Academy in Inner Mongolia in 2016 are as follows:

Nano carbon urea provide by the company contents 46% nitrogen, 0.57% nano carbon sol solute mass, 10% nano carbon sol addition amount of fertilizer weight, color: gray.

Corn variety: Simon 568

Testing site: Garden Canal Experimental Station of Agricultural and Animal Husbandry Science Research Institute, Bayannur City The plot was randomly arranged, 5 treatments were performed, 4 times were repeated, 16 plots were planted, and the results were as follows:

TABLE 1 results of application of nano carbamide in maize

| No. | Treatment | Sol addition | Fertilizer useing description | Fertilizer rate (kg/a unit of area) Base fertilizer | Additional fertilizer | Yield kg/a unit of area | Increasing yield % |
|---|---|---|---|---|---|---|---|
| 1 | Regular fertilizing | 0 | Pure nitrogen 20 kg/a unit of area, $P_2O_5$ 12 kg/a unit of area, $K_2O$ 5 kg/a unit of area | Common urea 8.3 | Common urea 30 | 1002.98 | |
| 2 | Nano carbon urea | 10% | Pure nitrogen 20 kg/a unit of area, $P_2O_5$ 12 kg/a unit of area, $K_2O$ 5 kg/a unit of area | Common urea 8.3 | Nano urea 30 | 1108.28 | 10.5 |
| 3 | Nano carbon urea-N 10% | 10% | Pure nitrogen 18 kg/a unit of area, $P_2O_5$ 12 kg/a unit of area, $K_2O$ 5 kg/a unit of area | Common urea 8.3 | Nano urea 25 | 1095.12 | 9.2 |
| 4 | Nano carbon urea-N 20% | 10% | Pure nitrogen 16 kg/a unit of area, $P_2O_5$ 12 kg/a unit of area, $K_2O$ 5 kg/a unit of area | Common urea 8.3 | Nano urea 21 | 976.66 | −2.6 |

In 2014 and 2015, nano carbon sol was applied to maize crops, it is proved that the nano carbon has obvious effect on maize yield increase. On this basis, the experiment of adding urea to nano carbon sol was carried out in 2016, the amount of nano carbon added in the test was 10% of the fertilizer weight, field production test results shows: compared with normal urea, nano urea increases the yield by 10.5%. The yield increased by 9.2% when nitrogen fertilizer was reduced by 10%; In the case of reducing nitrogen fertilizer by 20%, the production is slightly reduced 2%. The results show that the nano-carbon can improve the utilization rate of nitrogen fertilizer and reduce nitrogen significantly, it is of great importance to improve the production and quality, reduce the input of agricultural chemicals and reduce the pressure of environmental pollution, it is in line with the development strategy of zero growth of chemical fertilizer and pesticide proposed by the state in the 13th five-year plan.

Embodiment 2

1. Fertilizer Effect Test of Tomato in Wuqing District, Tianjin

Test location: Huanghuadian Town, Wuqing District, Tianjin

Planting crops: tomato varieties gastrodia 54

Planting: the tomatoes were planted in the middle of January 2016

Fertilizer application: the bottom fertilizer includes potassium sulfate 50 kg/a unit of area, DAP 200 kg/a unit of area, chicken manure 4 cubic meter/a unit of area, the contrast is compound fertilizer (24-12-18), proceed four times of fertilization, 5 kg/a unit of area each time.

Fertilization: on February 25th, March 30th, April 20th, May 10th, respectively.

Contrast: conventional fertilizing compound fertilizer, (N:p2o5:k2o 24-12-18)

Treatment 1: fertilization fertilizer (N:p2o5:k2o 24-12-18)+10% nano carbon sol mixture Treatment 2: fertilization fertilizer (N:p2o5:k2o 24-12-18)+20% nano carbon sol mixture The test plot was repeated four times, and the harvest was calculated separately.

Table of application of nano-carbon fertilizer in No. 10 greenhouse

| Treatment | Fertilizer and dosage | | Area | Nano-carbon sol |
| | variety | dosage Kg/a unit of area | Area surface m² | fertilizer consumption (kg) | contains in each kilogram of fertilizer % |
|---|---|---|---|---|---|
| CK | compound fertilizer (once additional fertilizer) | 5 | 360 | 2.7 | |
| 0.57% Nano carbon addition | applly nano-carbon fertilizer one time | 5 | 360 | 2.7 | |
| CK | compound fertilizer(second additional fertilizer) | 5 | 360 | 2.7 | |
| 0.57% Nano carbon addition | applly nano-carbon fertilizer two times | 5 | 360 | 2.7 | |
| CK | compound fertilizer (third additional fertilizer) | 5 | 360 | 2.7 | |
| 0.57% Nano carbon addition | applly nano-carbon fertilizer three times | 5 | 360 | 2.7 | |
| CK | compound fertilizer (fourth additional fertilizer) | 5 | 360 | 2.7 | |
| 0.57% Nano carbon addition | applly nano-carbon fertilizer four times | 5 | 360 | 2.7 | |
| CK (in total) | compound fertilizer (fourth additional fertilizer) | 20 | 360 | 10.8 | 0 |
| Total nano carbon addition | applly nano-carbon fertilizer four times | 20 | 360 | 10.8 | 10.5 |

Table of application of nano-carbon fertilizer in No. 14 greenhouse

| Treatment | Fertilizer and dosage | | Area | Nano-carbon sol |
| | variety | dosage Kg/a unit of area | Area surface m² | fertilizer consumption (kg) | contains in each kilogram of fertilizer % |
|---|---|---|---|---|---|
| CK | compound fertilizer (once additional fertilizer) | 5 | 300 | 2.25 | |
| 0.57% Nano carbon addition | applly nano-carbon fertilizer one time | 5 | 300 | 2.25 | |
| CK | compound fertilizer (second additional fertilizer) | 5 | 300 | 2.25 | |
| 0.57% Nano carbon addition | applly nano-carbon fertilizer two times | 5 | 300 | 2.25 | |
| CK | compound fertilizer (third additionalfertilizer) | 5 | 300 | 2.25 | |
| 0.57% Nano carbon addition | applly nano-carbon fertilizer three times | 5 | 300 | 2.25 | |
| CK | compound fertilizer (fourth additional fertilizer) | 5 | 300 | 2.25 | |
| 0.57% Nano carbon addition | applly nano-carbon fertilizer four times | 5 | 300 | 2.25 | |
| CK (in total) | compound fertilizer (fourth additional fertilizer) | 20 | 300 | 9 | 0 |
| Total nano carbon addition | applly nano-carbon fertilizer four times | 20 | 300 | 9 | 22.2 |

Results of tomato fertilizer effect test in Wuqing Distric

| Treatment | C content of nano carbon sol % | Sol addition | base fertilizer | additional fertilizer 1 | additional fertilizer 2 | additional fertilizer 3 | additional fertilizer 4 | Yield kg/a unit of area | Increase yield % |
|---|---|---|---|---|---|---|---|---|---|
| Regular fertilizing | 0.57 | 0 | $K_3PO_4$ 50 $(NH_4)_2HPO_4$ 200 | 5 kg, 54% compound fertilizer | 5 kg, 54% compound fertilizer | 5 kg, 54% compound fertilizer | 5 kg, 54% compound fertilizer | 3298 | 0 |
| Nano-carbon fertilization | 0.57 | 10% | $K_3PO_4$ 50 $(NH_4)_2HPO_4$ 200 | 5 kg 24 Dec. 2018 Nano-carbon fertilization fertilizer | 5 kg 24 Dec. 2018 Nano-carbon fertilization fertilizer | 5 kg 24 Dec. 2018 Nano-carbon fertilization fertilizer | 5 kg 24 Dec. 2018 Nano-carbon fertilization fertilizer | 3671 | 11.2 |
| Nano-carbon fertilization fertilizer | 0.57 | 20% | $K_3PO_4$ 50 $(NH_4)_2HPO_4$ 200 | 24 Dec. 2018 Nano-carbon fertilization fertilizer | 24 Dec. 2018 Nano-carbon fertilization fertilizer | 24 Dec. 2018 Nano-carbon fertilization fertilizer | 24 Dec. 2018 Nano-carbon fertilization fertilizer | 3707 | 12.4 |

After ten times picking production statistics analysis of tomato: the average yield of tomatoes fertilized by conventional fertilization is 3298 kg/a unit of area, average yield of tomatoes fertilized by 10% weight nano-carbon solfertilization fertilizer is 3761 kg/a unit of area, the yield was 11.2% higher than that of conventional fertilization. Average yield of tomatoes fertilized by 20% weight nano-carbon solfertilization fertilizer with seedling transplanting and root management is 3707 kg/a unit of area, the yield was 12.4% higher. From the analysis of economic benefit, to prepare 10% weight nano-carbon solfertilization fertilizer, the cost of fertilizer is increased by one yuan per kilogram, the yield of tomatoes increases 373 kg/a unit of area by applying 20 kilograms of fertilizer in each unit of area, this price of tomatoes per kilogram is counted as 3 Yuan, the input-output ratio is 1:56, the efficiency is higher. When 20% weight nano-carbon solfertilization fertilizer is added, the input-output ratio decreases to 1:20, so that 10% is a reasonable addition amount.

Embodiment 3

Soybean experiment in Heilongjiang Agricultural Academy
Test site: Heilongjiang Academy of Agricultural Sciences Laboratory
Entrusted unit: Plant Nutrition and Environment Institute of Heilongjiang Agricultural Academy
1. Trial Objective
To determine the application effect and nitrogen utilization rate of nano-fertilizer on soybean and rice.
2. Raw Materials
Nano urea (46-0-0), calcium superphosphate (0-43-0), potassium sulfate (0-0-0-50), nano carbon sol content 0.57% solute, added amount is 10% of urea weight.
3. Test Method
Soybeans potted test
4. Soy Bean Test
There 3 plants per pot, repeat 6 times. N:P:K rating is 5:3.5:3, the results are as follows:

Test sheet of Heilongjiang soybean

| Treatment | Measurement | Sol addition | Nitrogen fertilization per pot | strain per pot | Average yield g/pot | Increase yield % |
|---|---|---|---|---|---|---|
| 1 | CK (withdrawal of nitrogenous fertilizer) | 0 | Urea 10.8 g heavy calcium 8.1 g potassium sulfate 6 g | 3 | 39 | — |
| 2 | Urea (conventional fertilization) | 0% | Urea 10.8 g heavy calcium 8.1 g potassium sulfate 6 g | 3 | 50 | — |
| 3 | Nano urea | 10% | Urea 10.8 g heavy calcium 8.1 g potassium sulfate 6 g | 3 | 60 | +20 |
| 4 | 90% Nano urea dosage (reduction of nitrogen fertilizer 10%) | 10% | Urea 9.7 g heavy calcium 8.1 g potassium sulfate 6 g | 3 | 48 | −4 |
| 5 | 80% Nano urea dosage (reduction of nitrogen fertilizer 20%) | 10% | Urea 8.1 g heavy calcium 8.1 g potassium sulfate 6 g | 3 | 42 | −16 |

The experiment results indicate that, as a fertilizer synergist, the nano-carbon can improve fertilizer efficiency and the utilization rate of fertilizer significantly. Compared with the urea formula fertilizer with equal nitrogen content, nano-carbon urea increase the production obviously, it increases the yield by 20%; when nitrogen is reduced by 10%, the yield is basically the same as conventional fertilization with slightly reduced, It shows that nano carbon can improve the utilization rate of fertilizer.

What is claimed is:

1. A method for producing stable fertilizer by adding nano-carbon sol in a nitrogen-containing fertilizer, wherein:
   the nano-carbon sol is 1.05 to 10% by weight of the nitrogen-containing fertilizer;
   pH of the nanometer carbon sol is <2.2, conductivity of the nanometer carbon sol is 2800-3400 μs/cm; carbon content of the nano-carbon sol is 0.57-2%, particle size<100 nm, potential difference is −30-35 mv.

2. The method according to claim 1, wherein the nitrogen-containing fertilizer comprises urea, nitrogenous compound fertilizer, or water flush fertilizer.

3. The method according to claim 1, wherein the nanometer carbon sol is added in the growing process of crops, or in the production process of the nitrogen-containing fertilizer, when added, the nano-carbon sol and the nitrogen-containing fertilizer fully contact and mix drying, drying temperature is 50-65° C.

* * * * *